May 3, 1932.  V. J. MOSS  1,856,881
HEAT INSULATING STRUCTURE
Filed Dec. 28, 1929
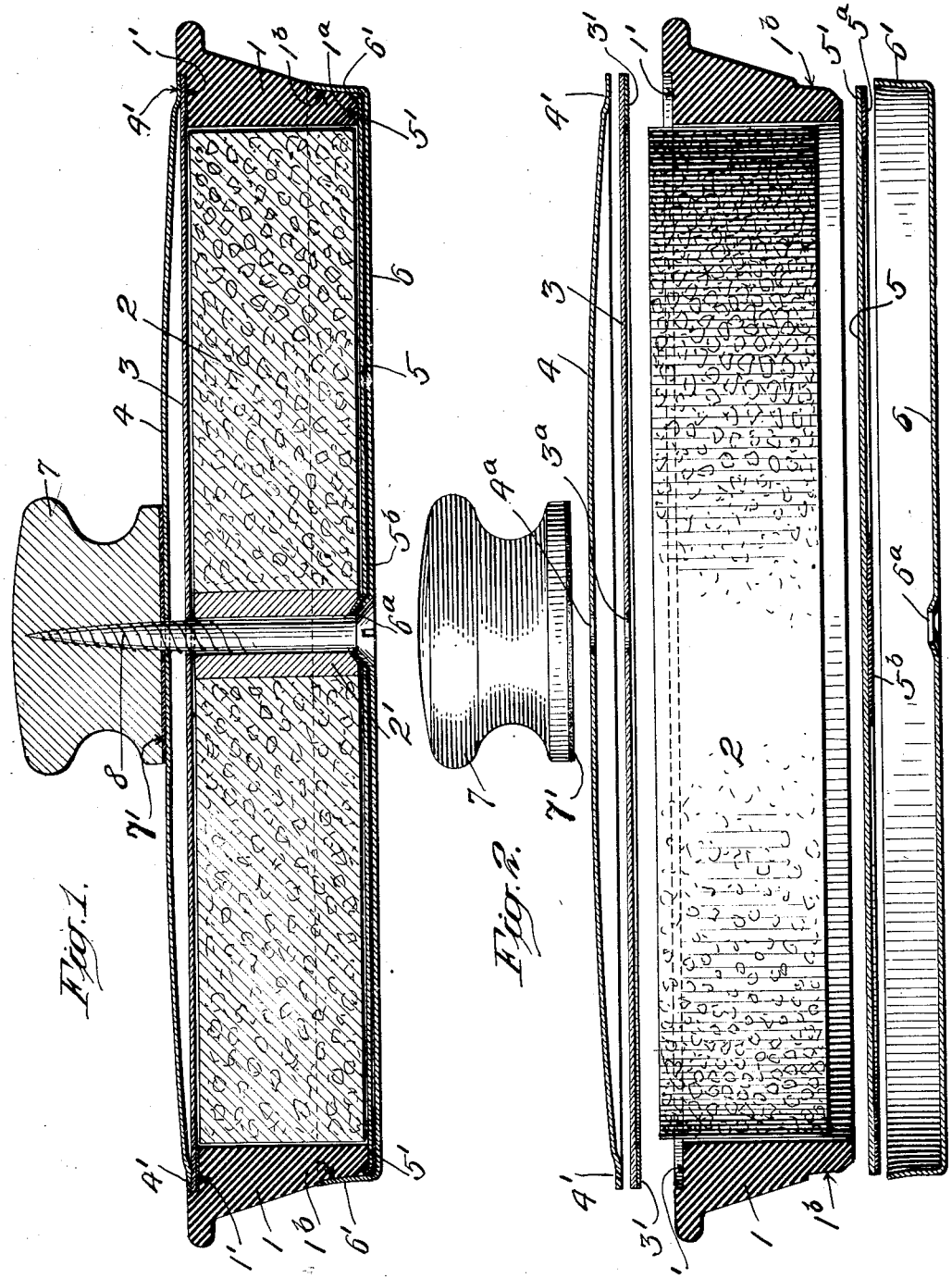
INVENTOR
Victor J. Moss
BY
Randolph & O'Brien
ATTORNEY Patented May 3, 1932

1,856,881

UNITED STATES PATENT OFFICE

VICTOR J. MOSS, OF BROOKLYN, NEW YORK

HEAT INSULATING STRUCTURE

Application filed December 28, 1929. Serial No. 417,066.

This invention relates to improvements in heat-insulating structures.

One of the objects of this invention is to provide a heat-insulating structure which is adapted for the fabrication of covers for ice cream cabinets and the like, and which will enable thorough and economical sealing of insulating material to be provided, while at the same time enabling the structural elements to be readily separable to permit repair or replacement of parts.

Another object of my invention is to enable the sealing up within a frame, such as the rim of the cover of an ice cream container or the like, of an insulating slab or disk of cork or other similar heat-insulating material, so as effectively to seal such insulating element by the use of relatively inexpensive materials, whereby circulation of air through the insulating chamber or compartment is prevented while at the same time enabling the other and more rigid parts of the structure to be separated or removed for the purpose of repair and replacement, when necessary.

Still another feature of my invention is the production of a heat-insulating structure by the placing or arrangement of an insulating disk or slab of cork or similar heat insulating material within an edge-surrounding frame and between outer and inner layers of a tough paper which is impregnated in a petroleum residuum or like material to cause the same to be more impervious to air and water, also to be odorless and to have insulating properties, and thereafter sealing the marginal edges of the paper layers to the frame member, whereby the insulating slab or disk is enclosed in a sealed compartment between the frame and opposite walls of said paper.

Still another object of my invention is to produce a cover or like structure for ice cream containers, embodying a frame or rim preferably formed of rubber or the like and lining walls of heavily impregnated paper provided with seals between the marginal edges of the paper and the frame to provide an air-tight compartment, the placing within said compartment of a slab or disk of insulating material and the reinforcement of said paper lining walls and the seal thereof with the frame by the use of metallic plates or disks arranged to cover and protect the lining and sealing paper and also to maintain the seal between the paper and frame or rim.

Still another part of my invention is to enable a bolt or screw in a structure of the character described to pass through the walls and lining of the insulating chamber or compartment so as to cause pressure to be exerted between the metal walls and frame and directly over the seal between the paper and the said frame while at the same time preventing circulation of air through said compartment.

With these and other objects in view, the invention comprises the combination of members and arrangement of parts so combined as to co-act and cooperate with each other in the performance of the functions and the accomplishment of the results herein contemplated; and comprises in one of its adaptations the species or preferred form illustrated in the accompanying drawings, in which:—

Fig. 1 is a vertical section through a cover of an ice cream cabinet embodying my invention and showing the parts in completely assembled conditions; and Fig. 2 is a view similar to Fig. 1 showing the parts disassembled and separated.

Referring now to these drawings which illustrate a preferred embodiment of my invention and show the making or fabrication of a cabinet cover for ice cream containers, 1 indicates a frame member which, in the embodiment shown, comprises the rim of the cabinet cover and is composed of rubber. In said embodiment, the frame member or rim 1 surrounds a block, slab or disk 2 of cork or similar material having high heat-insulating properties or qualities. The disk 2, as shown, is of similar thickness to the frame 1 and one of the features of my invention resides in providing a means for thoroughly sealing the insulating disk 2 within the frame member or rim 1.

As illustrated, the rim 1 is provided with a perimetric depressed seat 1' in the top surface thereof and a disk or layer 3 of paper is applied over the insulating disk 2 and has its edge portion fitting within the depressed seat 1′. In said preferred embodiment of my invention the disk 3 comprises a lining disk of tough paper impregnated with a petroleum residuum or like material for the purpose of providing a durable mildew-proof, odorless, non-porous, moisture-proof heat-insulating and practically air-tight sealing paper and I preferably apply to the marginal edge of the disk 3 a film 3′ of an adhesive material, such as an asphalt base cement or other sealing material.

The use of this paper in combination with the frame or rim provides an effective and thorough seal for the top surface of the structure and in certain structures a similar seal may be provided for the opposite bottom surface. In the fabrication of a cover for ice cream cabinets or containers and in certain other structures, it is desirable to prevent puncture of the layer of the sealing paper and for this purpose, I apply or superimpose above the layer of sealing paper a plate of metal, and in the preferred embodiment of my invention shown, I bolt this plate of metal 4 to the structure in such manner that the edge flange 4′ of said plate of metal will be superimposed above and bear against the marginal edge portion of the paper disk which carries the film of cementitious material and said marginal flange 4′ is caused to exert pressure on the sealed marginal edge of the paper disk or layer to press the same against the frame member or rim 1. Such pressure is preferably exerted by a bolt which fastens the plate 4 to the frame member or rim 1, as hereinafter described.

When my invention is applied to a cover of an ice cream cabinet, the bottom surface of the structure is preferably sealed by applying beneath the cork slab or disk 2 a bottom layer 5 of paper similar to layer 3, and having the upper surface of its marginal edge 5′ bearing against the bottom surface 1ª of the frame member or rim 1.

In order to cover and reinforce this bottom paper wall or lining of the structure, I provide a metal plate which, in the form of the invention shown, comprises a metallic cap 6 having an upwardly disposed perimetric flange 6′ which fits over a cap seat 1ᵇ in the outer edge of the frame or rim 1. This cap is preferably so arranged as to provide a tight fit between its seat and flanges 6′, and will, furthermore, press the impregnated-paper lining-wall or disk 5 against the bottom 1ª of the frame member or rim 1.

It is desirable, in cover construction, to provide a handle at the axis of the cover and in order to fasten this handle or knob securely in place, it is desirable to pass a screw axially through the cover structure. In the embodiment shown, I provide a handle 7 which is mounted upon a screw 8 passing axially through the insulating structure. In the preferred embodiment of my invention shown, I provide the block of insulating material at the axis thereof with a spool 2′ of wood or other tougher material and a screw 8 is passed through the axis of this wooden spool 2′.

In the said preferred embodiment of my invention, I utilize the knob 7 and the screw 8 as a clamping device for applying pressure to and clamping the metallic plate or disk 4 on the rim seat, and the screw 8 in this embodiment, therefore, performs the double function of detachably securing the plate 4 to the structure and maintaining the knob or handle 7 in place.

The passing of the screw axially through the structure makes it necessary to provide axial holes 3ª and 4ª through the paper disk 3 and metallic plate 4 and in order to effectively prevent circulation of air through the said holes 3ª and 4ª I preferably apply on the bottom of the knob 7 a layer or film 7′ of an adhesive cementitious sealing material. While the passage of said screw also at the top of the structure penetrates the disk 3ª we find that it is unnecessary to use further adhesive sealing material at this point. The passage of the screw 8 furthermore necessitates the making of a hole 6ª in the bottom cap plate 6, and in order to make an air-tight connection at this bottom portion of the structure I provide the bottom surface of the marginal edge 5′ of the paper disk 5 with a film 5ª of cementitious adhesive or sealing material and thus provide an effective seal between said paper disk 5 and metallic cap 6, which will prevent the circulation through the screw holes of any air which may find its way between the flange 6′ and the rim. I also preferably provide at the axis of the said paper disk 5 a circular film 5ᵇ of cementitious adhesive or sealing material and I am thus enabled to seal any space between the marginal edges of the hole 6ª and the shank of the screw 8 and this sealing or adhesive material will also surround and fill up any interstices or space between the shank of the screw and the opening through the paper disk 5 so as to prevent any access of air through the screw hole 6ª.

When the parts are assembled as shown in Fig. 1, a cover structure composed of my heating insulating material or structure is provided, and it will be apparent that the various parts of heat-insulating covers made in accordance with this invention will be separable from each other without destruction thereof, and that such covers will therefore be capable of being speedily reconditioned by repair or replacement of the parts thereof.

It will be understood that covers of the type illustrated for ice-cream cabinets are subjected to rough usage and that one or more parts of the same may be broken, badly scratched or indented while other parts remain intact. For example, top plate 4 may be bent, scratched or fractured while the balance of the cover may remain intact, and in accordance with my invention such covers may be quickly and economically reconditioned because the various parts may be readily separated and repaired or renewed and this may be accomplished without destroying the parts of the structure which are in good condition.

Similarly, in case a sealing paper or lining is punctured so as to destroy the value thereof, this disk of paper may be readily removed and replaced without material cost.

Having described my invention, I claim:

1. A heat-insulating structure embodying, in combination, a heat-insulating element composed of a light, porous material of low structural strength, a frame composed of a material having relatively high structural strength surrounding the edge of said insulating element, and walls of an odorless, non-porous, moisture and air-tight sealing paper arranged on the opposite sides of said insulating element and having an adhesively sealed connection with the frame to provide an air and water tight sealed compartment with said insulating material contained therein.

2. A heat-insulating structure embodying, in combination, a heat-insulating element composed of a light, porous material of low structural strength, a frame composed of a material having relatively high structural strength surrounding the edge of said insulating element, walls of an odorless, non-porous, moisture and air-tight sealing paper arranged on the opposite sides of said insulating element and having an adhesively sealed connection with the frame to provide an air and water tight sealed compartment with said insulating material contained therein, walls of metal applied over said paper walls to reinforce the same, and means for fastening said metal wall to the said structure.

3. A heat-insulating structure embodying, in combination, a heat-insulating element composed of a light, porous material of low structural strength, a frame composed of a material having relatively high structural strength surrounding the edge of said insulating element, walls of an odorless, non-porous, moisture and air-tight sealing paper arranged on the opposite sides of said insulating element and having an adhesively sealed connection with the frame to provide an air and water tight sealed compartment with said insulating material contained therein, walls of metal applied over said paper walls to reinforce the same, and means for releasably fastening said metal walls to said frame.

4. A heat-insulating structure embodying, in combination, heat-insulating element composed of a light, porous material of low structural strength, a frame composed of a material having relatively high structural strength surrounding the edge of said insulating element, and walls of an odorless, non-porous, moisture and air-tight sealing paper arranged on the opposite sides of said insulating element and having an adhesively sealed connection with the frame to provide an air and water tight sealed compartment with said insulating material contained therein, walls of metal applied over said paper walls to reinforce the same, said metallic walls having a marginal portion seated over the sealing connection between the paper wall and the frame, and means for fastening and applying pressure by one of said metal walls on said sealing connection.

5. A heat-insulating structure embodying, in combination, a heat-insulating element composed of a light, porous material of low structural strength, a frame composed of a material having relatively high structural strength surrounding the edge of said insulating element, walls of an odorless, non-porous, moisture and air-tight sealing paper arranged on the opposite sides of said insulating element and having an adhesively sealed connection with the frame to provide an air and water tight sealed compartment with said insulating material contained therein, walls of metal applied over said paper walls to reinforce the same, said metallic walls having a marginal portion seated over the sealing connection between the paper wall and the frame, a screw passing through said opposite metal plates, and means cooperating with said screw to apply pressure thereby on the plates.

6. A heat-insulating structure embodying, in combination, a heat-insulating element composed of a light, porous material of low structural strength, a frame composed of a material having relatively high structural strength surrounding the edge of said insulating element, walls of an odorless, non-porous, moisture and air-tight sealing paper arranged on the opposite sides of said insulating element and having an adhesively sealed connection with the frame to provide an air and water tight sealed compartment with said insulating material contained therein, walls of metal applied over said paper walls to reinforce the same, said metallic walls having a marginal portion seated over the sealing connection between the paper wall and the frame, a screw passing through said opposite metal plates, means cooperating with said screw to apply pressure thereby on the plates and also cooperating with said plates to apply pressure thereby on the sealed connection between the paper and frame.

In witness whereof, I have signed my name to the foregoing specification.

VICTOR J. MOSS.